(12) United States Patent
Harris et al.

(10) Patent No.: US 11,628,771 B2
(45) Date of Patent: Apr. 18, 2023

(54) POWERFOLD ACTUATOR WITH PAWL ACTUATED DRIVE, REAR VIEW SYSTEM AND VEHICLE

(71) Applicant: MOTHERSON INNOVATIONS COMPANY LIMITED, London (GB)

(72) Inventors: Tom Harris, Portchester (GB); Gareth Aspden, Portchester (GB)

(73) Assignee: Motherson Innovations Company Limited, London (GB)

( * ) Notice: Subject to any disclaimer, the term of this patent is extended or adjusted under 35 U.S.C. 154(b) by 370 days.

(21) Appl. No.: 16/893,043

(22) Filed: Jun. 4, 2020

(65) Prior Publication Data

US 2020/0384920 A1    Dec. 10, 2020

(30) Foreign Application Priority Data

Jun. 5, 2019 (DE) .................... 10 2019 115 163.5

(51) Int. Cl.
*B60R 1/074* (2006.01)

(52) U.S. Cl.
CPC .................................. *B60R 1/074* (2013.01)

(58) Field of Classification Search
None
See application file for complete search history.

(56) References Cited

U.S. PATENT DOCUMENTS

| | | | | |
|---|---|---|---|---|
| 5,172,884 A | * | 12/1992 | Ishiyama | B60R 1/074 248/479 |
| 6,132,050 A | * | 10/2000 | Sakata | B60R 1/076 248/478 |
| 2004/0012867 A1 | * | 1/2004 | Sakata | B60R 1/074 359/871 |
| 2011/0261476 A1 | * | 10/2011 | Van Stiphout | B60R 1/072 359/877 |

FOREIGN PATENT DOCUMENTS

EP    2548770 A1    1/2013

OTHER PUBLICATIONS

German Office Action dated Dec. 20, 2019 of German application No. DE 102019115163.5.

* cited by examiner

*Primary Examiner* — Jennifer D. Carruth
(74) *Attorney, Agent, or Firm* — Jones Day

(57) ABSTRACT

A powerfold actuator system for a rear view device, a rear view device includes such an actuator system and a vehicle includes such a rear view device. The powerfold actuator system includes a core base fixedly attached to the vehicle, a housing structure attached to the rear view device, which is arranged to rotate around the core base, and at least a drive system to rotate the housing structure being contained in the core base and comprising at least a motor, a gearing structure, and a pawl.

13 Claims, 5 Drawing Sheets

POWERFOLD ACTUATOR WITH PAWL ACTUATED DRIVE, REAR VIEW SYSTEM AND VEHICLE

CROSS-REFERENCE TO RELATED APPLICATION

This application claims the benefit of foreign priority to German Patent Application No. DE 10 2019 115 163, filed Jun. 5, 2019, which is hereby incorporated by reference in its entirety for all purposes.

BACKGROUND

1. Field of the Invention

The invention relates to a powerfold actuator system for a rear view device, a rear view device comprising such an actuator system and a vehicle comprising such a rear view device.

2. Related Art

In rear view devices, such as rear view mirror devices, it is state-of-the-art to use actuators in order to adjust the mirror plate so that it matches the field of view appropriate for the respective driver. Furthermore, powerfolds for folding the mirror, for example while the vehicle is in a parking situation, also using actuators are known in the art.

However, incorporating one or more actuators in order to provide the functionality for adjusting the mirror plate and/or folding the mirror lead to numerous parts required for proper operation of the mirror. Moreover, existing electromechanical power folding actuators are often noisy, heavy and large in size. State of the art power folding actuators require high strength metallic components (e.g. gearing) due to the high shock loads subjected onto the gear train through the system during impact. In addition, assembly, implementation and maintenance of the respective actuators is often hard. All these circumstances in turn lead to relatively high costs and a heavy weight associated with known power folding actuators.

The same aspects apply mutatis mutandis also to advance vehicle replacement systems, such as rear view cameras, which also require the functionality of adjusting the field of view and/or folding the system by mechanical movement of the system.

It would be desirable to have an electromechanical power folding actuator system available, which is at least less heavy and more economic than the devices according to the current state of the art.

SUMMARY

In an aspect, a powerfold actuator system, for a rear view device of a vehicle enabling an adjustment of the rear view device, includes a core base suited to be fixedly attached to the vehicle; a housing structure suited to be attached to the rear view device, which is arranged to rotate around the core base, and at least a drive system to rotate the housing structure, being contained in the core base and comprising at least a motor, a gearing structure and a pawl, the pawl being arranged to lock the gearing structure in case of the rear view device is intended to be in a certain permanent position, where the gearing structure is intended to unlock the pawl in case of the rear view device being electrically rotated around the core base.

The components might be made of metal and/or plastic. A powerfold actuator denotes an actuator adapted to actuate a component via an electrically controlled motor. Nevertheless, the powerfold actuator might by adapted to enable manual movement of the components independently from the electrically driven actuation. The shape of core base and housing structure is adapted to the required shapes to fit together and to the vehicle in order to be attachable to the vehicle. Locking of a component into a certain structure denotes a reversible fixation of this component to the structure. The gearing structure denotes all components required to establish a drive train from the motor to the component to be actuated. The provided electromechanical power folding actuator system is at least less heavy and more economic than the devices according to the current state of the art.

In an embodiment of the actuator system, the gearing structure includes a drive ring gear, arranged around the core base and coupled to the motor via the gearing structure, further including a worm wheel, which comprises a cam surface. The cam surface may be shaped to move the pawl out of its locked position in case of electrically rotating the rear view device. The gearing structure may further include a hypoid gear coupled to the worm wheel via a shaft to rotate the drive ring gear and a worm gear to rotate the worm wheel and therefore the hypoid gear. This arrangement may be a compact solution for folding the rear view device in a housing with small size.

In an example embodiment, the cam surface may be a protrusion out of a surface of the worm wheel facing towards the pawl, in particular with an oval cross-section. As the actuator system begins to operate while the pawl is in in locked position, the cam surface on the worm wheel may lower the pawl from said engaged position within engagement slots. This allows a rotation together with the lower housing relative to the core base.

In an embodiment of the actuator system, the drive ring gear may include at least two first engagement slots, also referred to as only 'engagement slots', and the pawl includes one engagement arm shaped to fit into the first engagements slots of the drive ring gear. Further, the pawl can be arranged inside the drive ring gear and mounted to the core base to rotate around a pawl rotation axis in order to engage or disengage from the first engagements slots by rotating around the pawl rotational axis. This arrangement provides a mechanical stable solution for locking/de-locking the actuator system. The arrangement of the pawl inside the drive ring gear establish a space saving arrangement of the locking/de-locking means and enables a robust operation at small size of the actuator system.

In another example, the drive ring gear includes three first engagement slots, which are symmetrically located to each other on a side of the drive ring gear (each in an angle of 120° to each other) which are facing towards the vehicle. This ensures that the pawl can be locked into the engagement slots after having executed the powerfold action without folding the rear view device beyond a certain folding limit independently from the actual position of the drive ring gear.

In an embodiment of the actuator system, the motor is a DC motor, which is coupled to a worm gear via a worm wheel. The worm wheel rotates simultaneously the pawl and a hypoid gear, whereby the hypoid gear is coupled to the worm wheel via a shaft, where the hypoid gear engages into teeth arranged into an inner surface of the drive ring gear. This arrangement establishes a simple and robust drive train providing a reliable actuator system. The gearing system thus includes the worm gear, the worm wheel, the hypoid gear and the shaft.

In another embodiment of the actuator system, a spring force acts on the pawl in order to press the pawl against the drive ring gear to engage into the first engagement slots. The spring force may be provided by a cone spring arranged around a retaining pin located inside the core base. Further, the engagement arm of the pawl may be adapted to slide along a lower surface of the drive ring when being disengaged from the first engagement slots and the spring force is adapted to maintain permanent contact between the engagement arm of the pawl and the sliding surface of the drive ring gear. As the system begins to rotate to a drive position of the rear view device, the lowered pawl will travel back along the lower surface of the drive ring gear until it reaches the engagement slots at which point the pawl will snap back into place with the aid of the cone spring to lock the device in a unfolded position (drive position). The cam surface on the worm wheel will then be unable to re-lift the pawl due to relative timing, therefore increasing the rotational resistance and causing a detectable stall to end the drive activity. The aforementioned relative timing of the cam surface to the hypoid gear can be achieved with a specific backlash that exists between these two common-axis parts.

In an embodiment, the drive ring gear includes second engagement slots from an upper side facing towards the rear view device and a locating ring arranged on top of the drive ring gear comprising detents adapted to engage into the second engagement slots and comprising radially directed protrusions to engage into the housing structure. This ensures the rotating direction of the housing structure based on the rotation of the inner mechanism. The locating ring may also be adapted to disengage from the second engagement slots in case of mechanical impact acting on the rear view device to decouple the rear view device from the gearing structure, preferably from the drive ring gear. The engaged locating ring transfers the rotation of the drive ring gear in a simple manner to the housing in order to fold or unfold the rear view device.

In another embodiment a spring, in particular in form of a wave spring, may be arranged between the locating ring and an upper housing of the housing structure in order to enable the locating ring to re-engage into the second engagement slots after being disengaged due to the mechanical impact in case of the detents of the locating ring fit into the second engagement slots. The spring offers a simple solution in order to reestablish the power fold function after the actuator system was manually folded due to the mechanical impact from the outside, e.g. a collision of the read view device with an obstacle, e.g. a person or another vehicle.

In another example, the drive ring gear includes three second engagement slots, also referred to as detent slots, which are arranged symmetrically on the upper side of the drive ring gear. On the underside of the locating ring there are three detent teeth which engage with the detent slots within the drive ring gear. These detents ensure that the locating ring and drive ring gear rotate together when electrically operated, however will also ensure that the locating ring will act as a clutch when under the influence of a manual impact and cause the detents to disengage and both parts will rotate independently of one another.

In one embodiment, the actuator system further includes a cap, which may be part of the housing structure, arranged to cover the core base, the motor and the gearing structure to ensure all components remain in place.

In another embodiment, the actuator system further includes a control system adapted to initiate the actuator system in response to a corresponding input signal in case of a demanded adjustment or in response to a corresponding sensor signal.

The actuator according to the present invention is less heavy and smaller than the devices according to the current state of the art and includes only one motor to drive the axles of the actuator. Additionally, the single motor drive allows to drive the actuator with less noise. Therefore, the actuator may be suitable to solve the objective problem.

In another aspect, a rear view system includes a rear view device and the powerfold actuator system connected to the rear view device.

In another aspect, a vehicle includes the rear view system attached to the vehicle, with preferably the control system being connected to or being provided by the vehicle control system.

Commonly the vehicle comprises two rear view devices at the outside of the vehicle on driver and passenger side as well as one interior rear view device. At least one, preferably all of these rear view devices may include an actuator system according to the present invention. The term vehicle may denote any kind of vehicle being equipped with at least one rear view device.

BRIEF DESCRIPTION OF THE DRAWINGS

The above listed embodiments can be used individually or in any combination to provide the device and the process in accordance with the invention. These and other aspects of the invention are shown in detail in the illustrations as follows.

DETAILED DESCRIPTION

Figure 1:
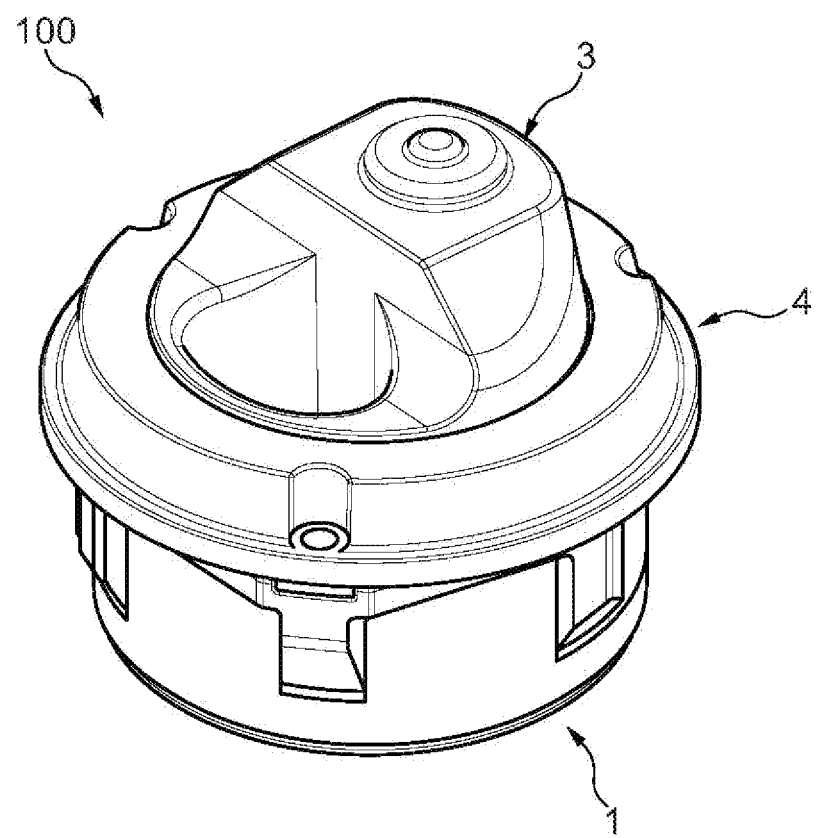
FIG. 1 is a perspective view of an embodiment of an actuator system according to the present invention from outside.

FIG. 1 shows an embodiment of an actuator system 100 according to an example of the present invention from the outside. The elements that can be seen as the outer packaging comprises of a lower housing 1, an upper housing 4 and a cap 3. This is also referred to as a housing structure. A core base 2 is only partially outside at the bottom of the lower housing. In an embodiment, the core base 2 is mounted rigidly to a vehicle by a mirror base frame such that the lower housing 1 and upper housings 4 rotate around it in support of a mirror or camera monitoring system via the mirror case frame. In an embodiment the upper housing 4 can either be attached (screwed or clipped) directly to the mirror case frame or could be the case frame itself. In the embodiment shown in FIG. 1 the upper housing 4 or case frame is attached to the lower housing 1 via three screws evenly distributed around the outer profile of the housings.

Figure 2:
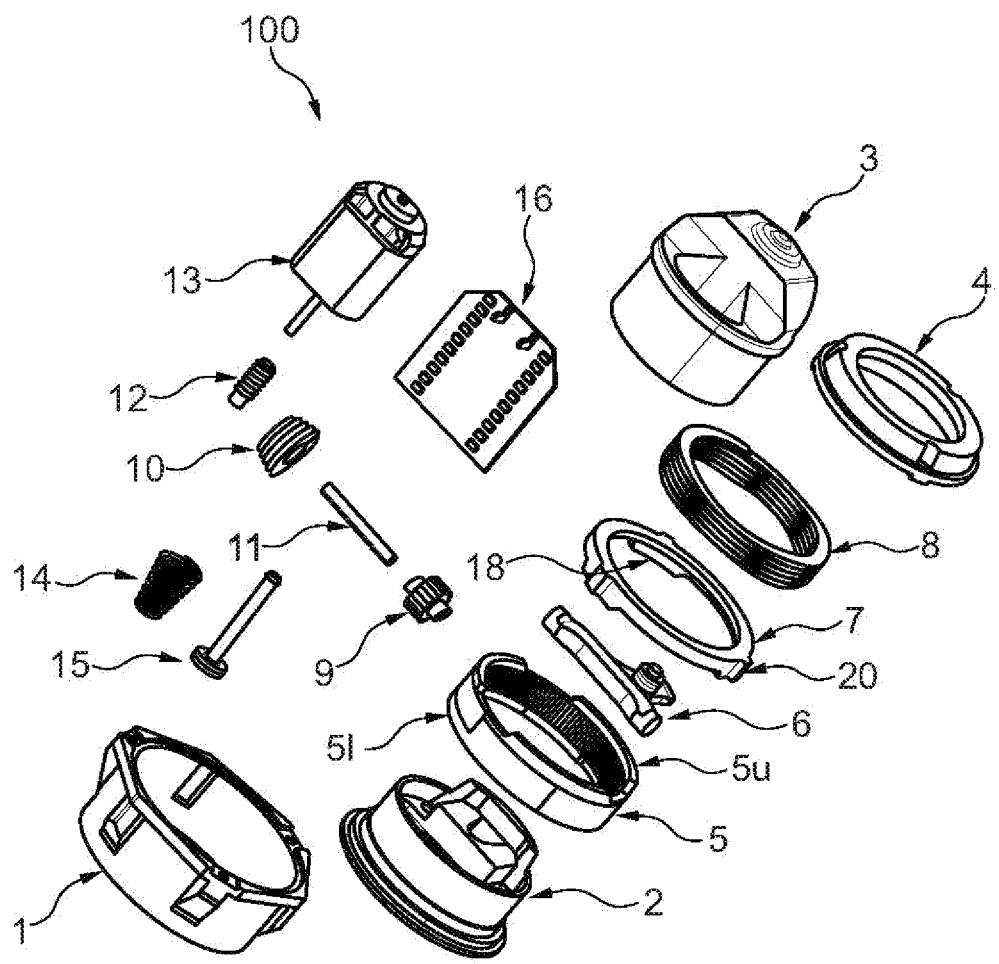
FIG. 2 is an explosion view of the actuator system of FIG. 1.

FIG. 2 shows the explosion view of the actuator system 100. The core base 2 contains the electronics and majority of a drive system for driving the actuator system. Between the lower housing 1, the upper housing 4 and the cap 3 (as shown in FIG. 1), the actuator system includes a DC motor 13, a PCB (PCBA) 16, a worm gear 12, a worm wheel 9, a shaft 11, a hypoid gear 10, a cone spring 14, a retaining pin 15 and a pawl 6, which remain together with the core base 2. The cap 3 over the top of the core base 2 and its internal components ensure they remain in place. The upper and lower housings 1, 4 move relative to this and contain a main drive ring gear 5 (also called ring gear) with a lower surface 5l directed towards the vehicle and an upper surface 5u directed towards the locating ring, a spring 8, for example in form of a wave spring, and a locating ring 7 with detents 18 directed towards the upper surface of the drive gear ring 5 and protrusions 20 directed radially towards the housing structure 1, 4 enclosing the locating ring 7 and other parts.

Figure 3:
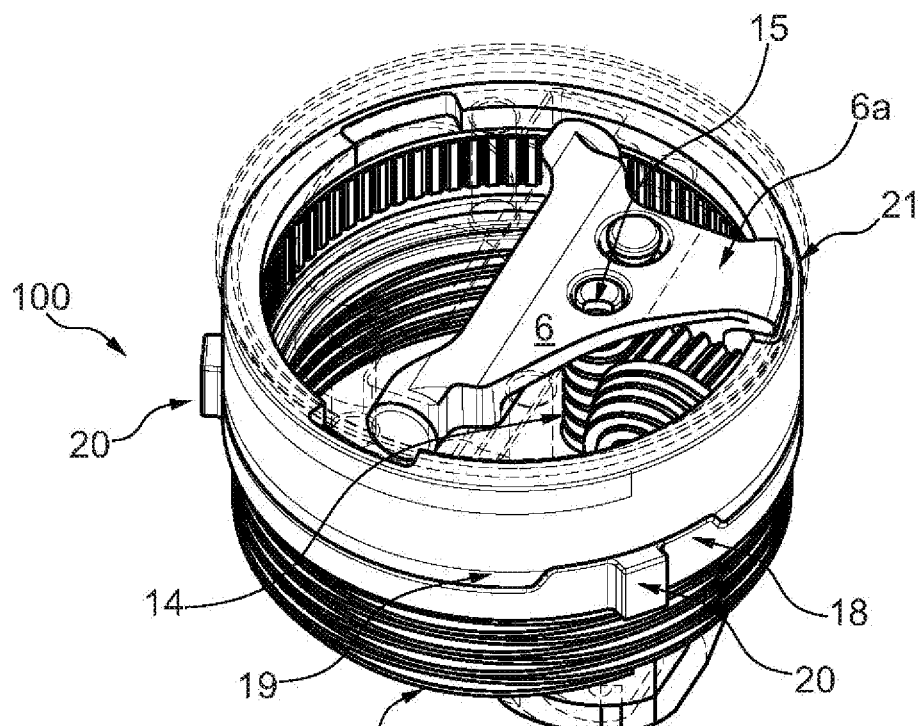
FIG. 3 is a bottom view of an internal mechanism of the actuator system of FIG. 1.

FIG. 3 shows the bottom view of an internal mechanism of the actuator system 100. In a default rest state, the lower housing 1 (not shown in FIG. 3, see FIGS. 1 and 2) sits on the lip around the outer profile of the core base 2 which acts as a bearing surface while the lower housing 1 is rotating. The drive ring gear 5 rests on top of a small ledge on the inside profile of the lower housing 1 to keep it in position in such a way that there is sufficient clearance between the outer diameter of the drive ring gear 5 and the inner diameter of the lower housing 1 to allow for both components to slip relative to each other if manually impacted. A locating ring 7 fits inside the lower housing 1 by three evenly spaced small tabs as radially directed protrusions 20 around the outer profile of the locating ring 7 which sits inside three equally spaced slots within the lower housing 1 (not shown here). These features ensure both components 1, 4, 7 rotate together. On the underside of the locating ring 7 there are three detents 18 which engage with the detent slots 19 within the drive ring gear 5. These detents ensure the locating ring 7 and drive ring gear 5 rotate together when electrically operated, however will also ensure that the locating ring 7 will act as a clutch when under the influence of a manual impact and cause the detents 18 to disengage from the second engagement slots 19 and both parts will rotate independently of one another. Furthermore, a spring 8, preferably in form of a wave spring, is arranged between the locating ring 7 and an upper housing 4 of the housing structure (not shown here, see FIG. 2) in order to enable the locating ring 7 to re-engage into the second engagement slots 19 after being disengaged due to the mechanical impact in case of the detents 18 of the locating ring 7 fit into the second engagement slots 19. Furthermore, a cone spring 14 provides a spring force acting on the pawl 6 in order to press the pawl 6 against the drive ring gear 5 to engage into the first engagement slots 21. The engagement arm of the pawl 6a is adapted to slide along a lower surface 5l of the drive ring gear 5 when being disengaged from the first engagement slots 21 and the spring force is adapted to maintain permanent contact between the engagement arm 6a of the pawl 6 and the sliding lower surface 5l of the drive ring gear 5. The cone spring 14 is arranged around a retaining pin 15 located inside the core base 2.

Figure 4:
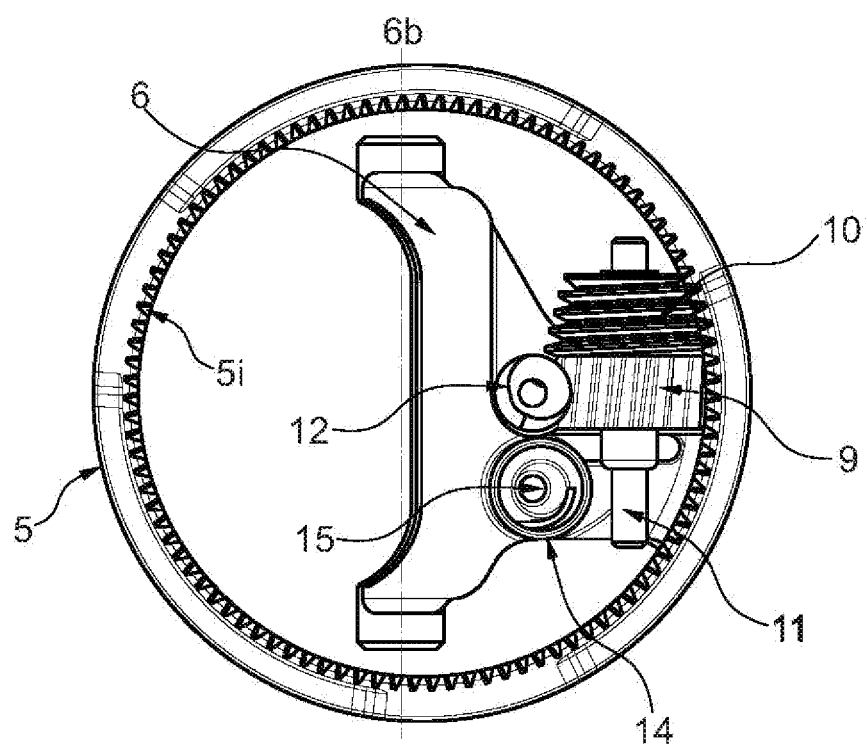
FIG. 4 is a top view of a gearing structure of the actuator system of FIG. 1.

FIG. 4 shows the top view of the gearing structure of the actuator system 100. During electrical operation the DC motor 13 (not shown here, see FIGS. 1 and 2) and worm gear 12 will drive the worm wheel 9 and hypoid gear 10 which are fitted together onto the same shaft 11. The hypoid gear 10 is then directly linked to the drive ring gear 5, here to the inner surface 5i of the drive ring gear comprising teeth to fit into the hypoid gear 10, allowing it to rotate. In an embodiment a spring 8, preferably in form of a wave spring, then sits in between the locating ring 7 and the inside of the upper housing 4, forming a closed force loop within the outer rotating components 1, 4, 5, 7, 8. The spring 8 can also interact with the shoulder of the cap 3 to prevent vertical movement, but is not normally in contact with it. A raised ledge on the rear face of the core base 2 prevents the cap 3 from rotating independently of it by engaging into a similarly shaped slot on the lower rear face of the cap 3.

Figure 5:
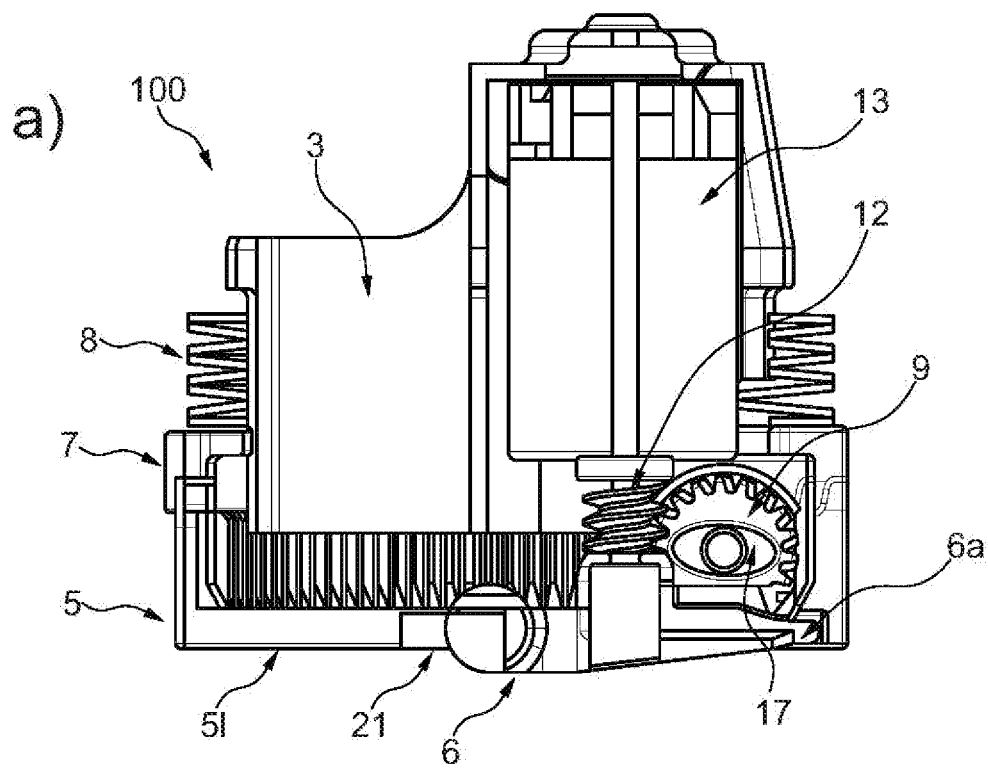
FIG. 5 is a sectional view of the actuator system of FIG. 1, with (a) locked pawl position and (b) unlocked pawl position.
Figure 5:
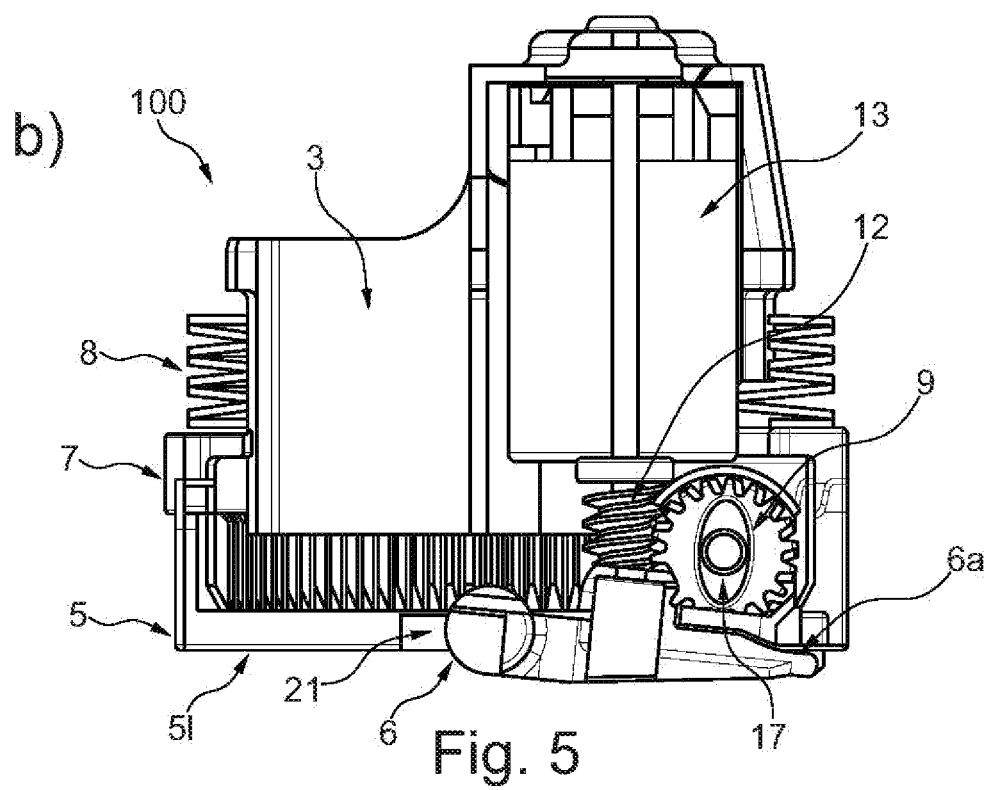

FIG. 5 shows a sectional view of the actuator system 100 with (a) locked pawl position and (b) unlocked pawl position. As the system begins to operate a cam surface 17 on the worm wheel 9 will lower the pawl 6 from its engaged position within engagement slots 21 on the lower surface 5l of the drive ring gear 5 therefore allowing it to rotate relative to the core base 2 (FIG. 5a). This happens together with the lower housing 1. As the system continues to rotate the pawl 6 will remain lowered as it runs across the lower surface 5l of the drive ring gear 5. The pawl 6 will remain in this position until a device (e.g. mirror) connected to the actuator system 100 hits an external stop causing the rotational resistance to increase sharply, causing a detectable stall that can be used to electronically end the drive activity. To return the mirror or camera monitoring system from folded (park) position back to un-folded (drive) position the motor 13 will drive in the opposite direction causing the lower and upper housing 1, 4 to rotate back (FIG. 5b). As the system 100 begins to rotate to the drive position the lowered pawl 6 will travel back along the lower surface 5l of the drive ring gear 5 until it reaches the engagement slots 21 at which point the pawl 6 will snap back into place with the aid of a cone spring 14 (not shown here) to lock the device in a first position (e.g. mirror head in the drive position). The cam surface 17 on the worm wheel 9 will then be unable to re-lift the pawl 6 due to relative timing, therefore increasing the rotational resistance and causing a detectable stall to end the drive activity. The aforementioned relative timing of the cam surface 17 to the hypoid gear 10 will be achieved with a specific backlash that exists between these two common-axis parts.

Figure 6:
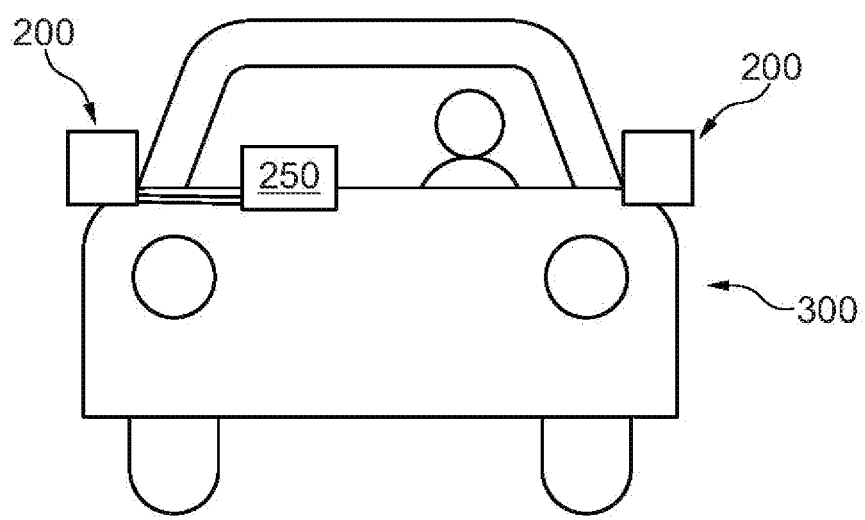
FIG. 6. is a schematic view of a vehicle according to the present invention.

FIG. 6 shows a schematic view of a vehicle 300 according to the present invention, where the vehicle 300 comprises a rear view system 250 comprising a rear view device 200 and a power folding actuator system 100 according to the present invention connected to the rear view device 200.

The embodiments shown here are only examples of the present invention and must therefore not be understood as restrictive. Alternative embodiments considered by the skilled person are equally covered by the scope of protection of the present invention.

REFERENCE SIGNS

1 Lower housing
2 Core base
3 Cap
4 Upper housing
5 Drive ring gear
5i Inner surface of the drive ring gear
5l lower surface
5u upper surface
6 Pawl
6a engagement arm of the pawl
6b pawl rotational axis
7 Locating ring
8 Spring
9 Worm wheel 10 Hypoid gear
11 Shaft
12 Worm gear
13 Motor
14 Cone spring
15 Retaining pin
16 PCBA
17 Cam surface
18 Detents (detent teeth)
19 Second engagement slots, e.g. detent slots
20 Radially directed protrusions of the locating ring
21 First engagement slots, e.g. engagement slots
100 Actuator system according to the present invention
200 Rear view device
250 Rear view system according to the present invention
300 Vehicle according to the present invention

What is claimed is:

1. A powerfold actuator system for a rear view device of a vehicle enabling an adjustment of the rear view device connected to the actuator system, the actuator system comprising:
    a core base configured to be fixedly attached to the vehicle;
    a housing structure configured to be attached to the rear view device, which is arranged to rotate around the core base; and
    at least a drive system to rotate the housing structure, being contained in the core base and comprising at least a motor, a gearing structure, and a pawl,
    wherein the pawl is configured to lock the gearing structure in response to the rear view device being in at least one pre-determined fixed position, and
    wherein the gearing structure is configured to unlock the pawl in response to the rear view device being electrically rotated around the core base,
    wherein the gearing structure comprises:
        a drive ring gear arranged around the core base and coupled to the motor via the gearing structure, and
        a worm wheel comprising a cam surface which is shaped to move the pawl out of its locked position in case of electrically rotating the rear view device, with the cam surface being a protrusion out of a surface of the worm wheel facing towards the pawl and having an oval cross-section,
    wherein the drive ring gear comprises at least two first engagement slots, and the pawl comprises one engagement arm shaped to fit into the at least two first engagements slots of the drive ring gear, and
    wherein at least one of:
        the pawl is arranged inside the drive ring gear and mounted to the core base to rotate around a pawl rotation axis in order to engage or disengage from the at least two first engagements slots by rotating around the pawl rotational axis, and
        the drive ring gear comprises three first engagement slots which are symmetrically located to each other on a side of the drive ring gear facing towards the vehicle.

2. The actuator system according to claim 1, further comprising a cap arranged to cover the core base, the motor, and the gearing structure to ensure all components remaining in place.

3. The actuator system according to claim 1, further comprising a control system adapted to initiate the actuator system in response to a corresponding input signal or sensor signal.

4. A rear view system, comprising a rear view device and the powerfold actuator system according to claim 1 connected to the rear view device.

5. A vehicle, comprising at least one rear view system according to claim 4, wherein the control system is connected to or provided by the vehicle control system.

6. A powerfold actuator system for a rear view device of a vehicle enabling an adjustment of the rear view device connected to the actuator system, the actuator system comprising:
    a core base configured to be fixedly attached to the vehicle;
    a housing structure configured to be attached to the rear view device, which is arranged to rotate around the core base; and
    at least a drive system to rotate the housing structure, being contained in the core base and comprising at least a motor, a gearing structure, and a pawl,
    wherein the pawl is configured to lock the gearing structure in response to the rear view device being in at least one pre-determined fixed position, and
    wherein the gearing structure is configured to unlock the pawl in response to the rear view device being electrically rotated around the core base,
    wherein the gearing structure comprises:
        a drive ring gear arranged around the core base and coupled to the motor via the gearing structure, and
        a worm wheel comprising a cam surface which is shaped to move the pawl out of its locked position in case of electrically rotating the rear view device, with the cam surface being a protrusion out of a surface of the worm wheel facing towards the pawl and having an oval cross-section,
    wherein the gearing system comprises a worm gear, a worm wheel, a hypoid gear and a shaft,
    the motor is coupled to a worm gear via the worm wheel,
    the worm wheel rotates simultaneously the pawl, and
    the hypoid gear, whereby the hypoid gear is coupled to the worm wheel via the shaft, and the hypoid gear engages into teeth arranged into an inner surface of the drive ring gear.

7. A powerfold actuator system for a rear view device of a vehicle enabling an adjustment of the rear view device connected to the actuator system, the actuator system comprising:
    a core base configured to be fixedly attached to the vehicle;
    a housing structure configured to be attached to the rear view device, which is arranged to rotate around the core base; and
    at least a drive system to rotate the housing structure, being contained in the core base and comprising at least a motor, a gearing structure, and a pawl,
    wherein the pawl is configured to lock the gearing structure in response to the rear view device being in at least one pre-determined fixed position, and
    wherein the gearing structure is configured to unlock the pawl in response to the rear view device being electrically rotated around the core base,
    wherein the gearing structure comprises:
        a drive ring gear arranged around the core base and coupled to the motor via the gearing structure, and
        a worm wheel comprising a cam surface which is shaped to move the pawl out of its locked position in case of electrically rotating the rear view device, with the cam surface being a protrusion out of a surface of the worm wheel facing towards the pawl and having an oval cross-section, wherein the drive ring gear comprises at least two first engagement slots, and the pawl comprises one engagement arm shaped to fit into the at least two first engagements slots of the drive ring gear, wherein a spring force acts on the pawl in order to press the pawl against the drive ring gear to engage into the at least two first engagement slots.

8. The actuator system according to claim 7, wherein the spring force is provided by a cone spring arranged around a retaining pin located inside the core base.

9. A powerfold actuator system for a rear view device of a vehicle enabling an adjustment of the rear view device connected to the actuator system, the actuator system comprising:
- a core base configured to be fixedly attached to the vehicle;
- a housing structure configured to be attached to the rear view device, which is arranged to rotate around the core base; and
- at least a drive system to rotate the housing structure, being contained in the core base and comprising at least a motor, a gearing structure, and a pawl,
- wherein the pawl is configured to lock the gearing structure in response to the rear view device being in at least one pre-determined fixed position, and
- wherein the gearing structure is configured to unlock the pawl in response to the rear view device being electrically rotated around the core base,
- wherein the gearing structure comprises:
  - a drive ring gear arranged around the core base and coupled to the motor via the gearing structure, and
  - a worm wheel comprising a cam surface which is shaped to move the pawl out of its locked position in case of electrically rotating the rear view device, with the cam surface being a protrusion out of a surface of the worm wheel facing towards the pawl and having an oval cross-section,
- wherein the drive ring gear comprises at least two first engagement slots, and the pawl comprises one engagement arm shaped to fit into the at least two first engagements slots of the drive ring gear,
- wherein
  - the engagement arm of the pawl is adapted to slide along a lower surface of the drive ring gear when being disengaged from the at least two first engagement slots, and
  - the spring force is adapted to maintain permanent contact between the engagement arm of the pawl and the sliding lower surface of the drive ring gear.

10. A powerfold actuator system for a rear view device of a vehicle enabling an adjustment of the rear view device connected to the actuator system, the actuator system comprising: a core base configured to be fixedly attached to the vehicle a housing structure configured to be attached to the rear view device, which is arranged to rotate around the core base, and at least a drive system to rotate the housing structure, being contained in the core base and comprising at least a motor, a gearing structure, and a pawl, wherein the pawl is configured to lock the gearing structure in response to the rear view device being in at least one pre-determined fixed position, and wherein the gearing structure is configured to unlock the pawl in response to the rear view device being electrically rotated around the core base, wherein the gearing structure comprises: a drive ring gear arranged around the core base and coupled to the motor via the gearing structure, and a worm wheel comprising a cam surface which is shaped to move the pawl out of its locked position in case of electrically rotating the rear view device, with the cam surface being a protrusion out of a surface of the worm wheel facing towards the pawl and having an oval cross-section, wherein the drive ring gear comprises: second engagement slots from an upper side facing towards the rear view device, and a locating ring arranged on top of the drive ring gear comprises detents adapted to engage into the second engagement slots and comprises radially directed protrusions to engage into the housing structure.

11. The actuator system according to claim 10, wherein the locating ring is adapted to disengage from the second engagement slots in case of mechanical impact acting on the rear view device to decouple the rear view device from the gearing structure or the drive ring gear.

12. The actuator system according to claim 11, wherein a wave spring is arranged between the locating ring and an upper housing of the housing structure in order to enable the locating ring to re-engage into the second engagement slots after being disengaged due to the mechanical impact in case of the detents of the locating ring fit into the second engagement slots.

13. The actuator system according to claim 10, wherein the drive ring gear comprises three second engagement slots which are arranged symmetrically on the upper side of the drive ring gear.

* * * * *